United States Patent [19]

Walles

[11] 3,779,840

[45] *Dec. 18, 1973

[54] LAMINATION OF OLEFIN POLYMER TO VARIOUS SUBSTRATES

[75] Inventor: Wilhelm E. Walles, Midland, Mich.

[73] Assignee: The Dow Chemical Company, Midland, Mich.

[ * ] Notice: The portion of the term of this patent subsequent to Dec. 21, 1988, has been disclaimed.

[22] Filed: Aug. 11, 1971

[21] Appl. No.: 172,885

Related U.S. Application Data

[63] Continuation-in-part of Ser. No. 764,915, Oct. 3, 1968, Pat. No. 3,629,025.

[52] U.S. Cl. ............... 156/3, 117/47 A, 156/308, 156/330
[51] Int. Cl... B32b 31/24, B32b 27/38, B32b 27/32
[58] Field of Search .................. 156/3, 330, 308; 117/47 A

[56] References Cited
UNITED STATES PATENTS

| | | | |
|---|---|---|---|
| 3,629,025 | 12/1971 | Walles | 156/69 |
| 3,142,582 | 7/1964 | Koretzky et al. | 117/47 A |
| 3,192,092 | 6/1965 | Schonhorn | 156/308 |
| 3,586,569 | 6/1971 | Caiola | 156/308 |
| 3,607,350 | 9/1971 | Rathsack | 117/47 A |
| 3,625,414 | 12/1971 | Caiola | 156/308 |
| 3,684,554 | 8/1972 | Donald et al. | 117/47 A |
| 3,686,016 | 8/1972 | Maguire et al. | 117/47 A |
| 3,689,303 | 9/1972 | Maguire et al. | 117/47 A |
| 3,036,930 | 5/1962 | Grimminger et al. | 117/93 |
| 3,306,791 | 2/1967 | Nye | 156/3 |
| 3,725,109 | 4/1973 | Schulz et al. | 117/47 A |

*Primary Examiner*—Harold Ansher
*Attorney*—William M. Yates et al.

[57] ABSTRACT

Olefin polymers, such as polyethylene, are bonded to various substrates, such as metal, glass, plastic, paper, wood, by surface sulfonating the olefin polymer and adhering the surface sulfonated olefin polymer to the substrate with epoxy resin.

6 Claims, No Drawings

LAMINATION OF OLEFIN POLYMER TO VARIOUS SUBSTRATES

CROSS-REFERENCES TO RELATED APPLICATIONS

This is a continuation-in-part of Ser. No. 764,915 filed in Oct. 3, 1968 now U.S. Pat. No. 3,629,025.

BACKGROUND OF THE INVENTION

This invention relates to the lamination of olefin polymers to various substrates with epoxy resins.

Olefin polymers are known to be useful in a large number of applications such as in production of molded articles, films, fibers and the like. In many applications it would be highly desirable to be able to bond or laminate such olefin polymers to various substrates including substrates of the same olefin polymers as well as substrates of other polymers and substrates of completely different materials such as metal, glass, paper, wood and the like. Unfortunately, as is taught in "Handbook of Epoxy Resins," Lee and Neville (1967) at pages 21–26, olefin polymers are generally chemically inert to adhesives. Thus the desirable strong bonds are not generally formed between olefin polymer and adhesive in laminates of olefin polymers to different substrates.

It would therefore be highly desirable to provide a means for improving the bond strength between olefin polymers and various substrates.

SUMMARY OF THE INVENTION

The present invention is a method for bonding an olefin polymer to a substrate which comprises the steps of surface sulfonating the olefin polymer and adhering the surface sulfonated olefin polymers to the substrate with epoxy resin.

The practice of the present invention is useful in the sealing of olefin polymer containers; in laminating films or fibers of olefin polymers to films and/or fibers of like or different material such as metal, glass and the like; in adhering articles of metals, plastics, paper, glass and the like to olefin polymer articles, such as in the lamination of metallic spouts or inlet conduits to olefin polymer containers such as tanks and drums and the like; and in a wide variety of other application.

DETAILED DESCRIPTION OF THE PREFERRED EMBODIMENTS

For the purpose of this invention an "olefin polymer" means sulfonatable homopolymers and copolymers of monomers containing an ethylenically unsaturated group represented by the formula

By "sulfonatable polymer" is meant a polymer having hydrogen atoms bonded to carbon atoms. Preferred are polymers of α-monoolefins having from two to 12 carbon atoms such as ethylene, propylene, butene-1, isobutene, 4-methyl-1-pentene and the α-monoolefins having non-aromatic substituents such as vinyl chloride, vinylidene chloride, and acrylonitrile. Other suitable olefin polymers include polymers of diolefins such as the conjugated aliphatic dienes, e.g., butadiene and isoprene, and polymers of monovinylidene aromatic carbocyclic monomers such as styrene, t-butylstyrene, chlorostyrene and other substituted styrenes. Also included are polymers such as chlorinated polyethylene and chlorinated polypropylene as well as blends of the aforementioned polymers and copolymers. Especially preferred olefin polymers are the high density polyethylenes having densities in the range of from about 0.950 to about 0.978 and melt indexes in the range of from about 0.5 to about 15 decigrams per minute [ASTM D-1238-65T(E)] and polypropylenes having densities in the range of from about 0.900 to about 0.920 and melt flow viscosities in the range of from about 0.5 to about 15 decigrams/minutes [ASTM D-1238-65T(L)]. Also advantageously employed are acrylonitrile/butadiene/styrene terpolymers (so-called ABS resins) and polystyrene and impact polystyrene and styrene polymers containing from about 5 to about 25 weight percent of diene rubber such as polybutadiene and styrene/butadiene copolymer rubber.

The olefin polymer in the form of film, fiber or any other shaped article including containers and covers therefor, bottles, tanks, pails, etc., can be sulfonated by contacting the surfaces thereof with vapor phase or liquid phase sulfonating agents. Preferably, vapor phase sulfonating agents are employed. If desired, only the surface of the olefin polymer to be bonded to the substrate (i.e., the mating surface), need be sulfonated. Such can be accomplished by masking the portions of the olefin polymer which are not to be sulfonated. Generally this is not worthwhile since the time and effort required to mask such portions of the olefin polymer exceed the value of the chemicals needed to sulfonate the entire surface of the olefin polymer.

A preferred method of sulfonating the olefin polymers is to expose the olefin polymer to gaseous sulfur trioxide, preferably diluted with a dry inert gas such as air, nitrogen, helium, carbon dioxide, sulfur dioxide and the like. The concentration of sulfur trioxide in the gaseous sulfonating agent can vary from about 0.1 to 100 volume percent based on total gaseous sulfonating agent, preferably from about 2 to about 20 volume percent of sulfur trioxide. The foregoing volume concentrations correspond to about 0.003 to about 3 grams of sulfur trioxide per liter (at atmospheric pressure) for the range of 0.1 to 100 volume percent and about 0.06 to about 0.6 grams of sulfur trioxide per liter for the range of 2 to 20 volume percent. The time of sulfonation required to produce an acceptable degree of sulfonation varies with the concentration of sulfur trioxide and the temperature. For example, at room temperature (i.e.,~25°C), 2 volume percent sulfur trioxide requires a time of 0.3 to 90 seconds to provide acceptable degree of sulfonation. At temperature of 35°C, the time required when using 18 volume percent sulfur trioxide is shortened to about 0.1 to about 30 seconds. As evidenced by the foregoing, the time and concentration of sulfur trioxide are inversely related, thus any combination of the above variables may be used to suit specific needs. It is important to exclude water vapor from the above gases by a conventional drier tube since in the presence of water in a liquid or vapor form, the sulfur trioxide is converted to droplets of sulfuric acid of varying concentration and uniform sulfonation of the plastic is either inhibited or prevented.

Another method of sulfonating the plastic substrates is to use a 10% by weight solution of sulfur trioxide in an inert liquid solvent, such as a liquid poly-chlorinated aliphatic hydrocarbon. Inert liquid solvents coming within the purview of this embodiment of the invention are methylene chloride, carbon tetrachloride, perchloroethylene, sym-tetrachloroethane and ethylene dichloride. However, other concentrations may be used, for example, from about 1% to about 25% weight $SO_3$ in an inert solvent. A dilute solution in the range of 1–10 percent of weight with a contact time of thirty seconds to twenty minutes at room temperature (25°C) is normally adequate to give the desired degree of sulfonation, i.e., at least 0.001 milligram of sulfur trioxide equivalents in the form of sulfonic acid groups per square centimeter of polyolefin surface. To obtain a degree of sulfonation in the preferred range of 0.005 to 5 milligrams of sulfur trioxide equivalents per square centimeter, it is desirable to employ generally higher temperatures and/or concentrations of sulfur trioxide in the aforementioned range.

It is therefore to be understood that in either vapor phase or liquid phase the time and concentration are inversely related so that if short contact times are desired, one must use a higher concentration. Oversulfonation is to be avoided since the sulfonation agents can blacken the polymer and severely corrode it. Generally, an amount of sulfonation greater than 50 milligrams of sulfur trioxide equivalents per square centimeter does not contribute much to the ultimate adhesion and is therefore uneconomical.

Examples of other liquid phase sulfonating agents are oleum, chlorosulfonic acid, and sulfuryl chloride dissolved in a suitable inert solvent such as methylene chloride, carbon tetrachloride, perchloroethylene, tetrachloroethane, and ethylene dichloride. It is noted, however, that chlorosulfonic acid or sulfuryl chloride are generally more acceptable in treatment of aromatic olefin polymers such as polystyrene than in treatment of aliphatic olefin polymers such as polyethylene. It is further understood that olefin polymers which normally dissolve in the aforementioned solvents are preferably sulfonated with sulfur trioxide in the gaseous phase as previously described.

While the foregoing methods are preferable, this invention is not limited to enclosure members which are sulfonated by any particular technique. Therefore, any method of sulfonating plastic material which will give the hereinbefore specified degree of sulfonation is suitable for the purpose of this invention.

Following the sulfonation step, the sulfonated olefin polymer can be waterwashed, dried and coated with the epoxy resin. Alternatively the sulfonated olefin polymer can be neutralized with dilute aqueous ammonia, ammonia gas or various amines such as methyl amine, isobutylamine, tetramethylene pentamine, monoethanolamine, triethanolamine, diethanolamine, aqueous solutions of salts of hydroxides of alkali metals and alkaline earth metals, etc., prior to coating with the epoxy resin.

The epoxy resins used in this invention can be any of the known epoxy resins as set forth in the book "Handbook of Epoxy Resin" by Lee and Neville (1967), the preferred resins are liquid or flexible epoxy resins derived from the reaction of bisphenol A and epichlorophydrin. Preferably, they range in epoxide equivalent weight from 170–250. Preferred resins have a range of viscosities from 500–90,000 centipoises at 25°C depending on the amount of reactive diluents that are added. Typical reactive diluents are butyl glycidyl ether and phenyl glycidyl ether.

In addition to the reactive diluents, it is sometimes desirable to add nonreactive modifiers or extenders such as dibutyl phthalate, pine oil, glycol ethers, and coal tar. Since coal tar has a high degree of chemical resistance, it is the preferred modifier for use in epoxy resins in many applications.

The hardeners or curing agents used with the above epoxy resins to produce the final cured resin are primary and secondary amines such as diethylene triamine, triethylene tetramine, and tetraethylene pentamine; polyamides and the like. The amount of hardener to be used is usually an amount equal to the weight of the epoxy resin as is indicated in the above "Handbook of Epoxy Resins," Chapter 21.

The curing time for these epoxy resins and amine hardeners with modifying agent is on the order of several days at 25°C. However, the time can be shortened to a great extent by heating. Thus, the same resin/hardener formulation that takes 3 days to cure at 25°C can be cured in 1–2 hours at 100°C.

For the purposes of this invention, the substrate to which the olefin polymer is bonded is suitably composed of any material which forms a suitable bond with the epoxy resin as defined hereinbefore. The substrate may assume any solid form such as film, foil, fiber, sheet, plate, plaque, bowl, tub, or any other shaped article. Illustratively the material forming the substrate is glass; metal, such as steel, aluminum, copper, iron, zinc, lead, alloys thereof and the like; paper; wood; plastic and the like so long as it bonds well to epoxy resins. It is understood that, if the substrate comprises olefin polymer, it is surface sulfonated to the degree described hereinbefore.

The sulfonated olefin polymer is preferably adhered to the substrate by (1) applying epoxy resin to the locus of the seal, e.g., to the sulfonated olefin polymer or substrate or both, (2) placing the sulfonated olefin polymer in a contiguous relationship with the substrate such that the epoxy resin forms an interlayer between the sulfonated surface of the olefin polymer and the substrate and (3) curing the epoxy resin for a time and at a temperature sufficient to develop the desired maximum bond strength of the epoxy resin. Methods and conditions for applying epoxy resins to substrates and curing the resins are well known to the art.

The following examples are presented to illustrate the present invention and are not to be considered as a limitation on the scope of the claims.

EXAMPLE 1

A molded polypropylene automotive 12 volt battery case and cover with a peripheral groove are immersed in a 2 percent by weight solution of sulfur trioxide in methylene chloride for 2 minutes at 25°C. Both parts are removed and washed in a five percent by weight aqueous ammonia solution and dried.

The groove of the cover is then substantially filled with an epoxy formulation made from 98 parts of the diglycidyl ether of bisphenol-A having 186-192 epoxide equivalent weight and a viscosity of 11,000-14,000 centipoises at 25°C diluted with 2 parts butyl glycidyl ether. The final epoxy formulation is made by blending this with an equal weight portion of a 50 percent mixture of triethylene tetramine and coal tar containing a small amount of phenol to extend the setting time.

The case and cover are then assembled, pressed together, and cured for seven hours at room temperature.

The final sealed battery is found to be liquid tight and structurally strong.

EXAMPLE 2

In order to illustrate the superior strength of this method of sealing containers, the following example is presented.

A molded polypropylene battery cover having a peripheral groove is placed halfway into a 2 percent by weight solution of sulfur trioxide in methylene chloride for 1 minute at 25°C so that a portion of the cover is sulfonated in accordance with this invention and a portion is left untreated for comparison. The cover is removed and washed in a solution of 5 percent by weight of aqueous ammonia and dried. Six test strips of polypropylene (⅛ inch × 1-½ inches × 6 inches) are then sulfonated in a similar manner and bonded into the peripheral groove of the sulfonated half of the cover with the epoxy resin formulation of Example 1.

Six of the untreated polypropylene strips are bonded in the groove of the unsulfonated half of the cover with the epoxy resin formulation of Example 1.

After curing the assembly for 6 hours at room temperature, the assembly is clamped in an Instron testing machine, the strips are pulled and the force in pounds is recorded as a function of time. The strips bonded to the unsulfonated half of the cover failed in the range from 6–8 pounds. The strips bonded to the sulfonated half failed at 165 pounds while one strip broke into two pieces at 90 pounds (no failure of the bond). This test thus shows the bonding of the cover was increased at least 20 times by the sulfonation treatment and thus simulates an actual testing of the sealed battery under a rough handling test.

Improved results similar to the foregoing are obtained using a non-grooved cover.

EXAMPLE 3

In a manner similar to Example 2, a cover and test strips of high density polyethylene are sulfonated and sealed with epoxy resins to achieve greatly increased bonding of the strips to the cover.

EXAMPLE 4

Six molded polyethylene cylindrical containers 3 inches in diameter by 4 inches long having molded external screw threads on one end and mating molded polyethylene caps having internal threads are surface sulfonated by the method set forth in Example 1.

These containers are filled with calcium chloride and the external screw threads are coated with a non-hardening epoxy formulation made from 60 parts by weight of the diglycidyl ether of bisphenol A having an epoxy equivalent weight of 186–192, 40 parts by weight of the diglycidyl ether of a mixture of polypropylene glycols having molecular weights in the range 610–670 with an epoxide equivalent weight of 305–335 and 8.9 parts by weight of diethylene triamine. The containers are then sealed by screwing on the cap.

The advantage of this flexible epoxy resin formulation is that it never hardens and thus the screw cap can be secured and replaced several times with a good seal being obtained when it is screwed in place.

A similar set of unsulfonated containers are filled with the same deliquescent chemical and sealed with the same epoxy formulation.

When both sets of these containers are stored in a humid atmosphere (90% relative humidity) for 24 hours, it is found that moisture penetrates the seal of unsulfonated containers and cakes the calcium chloride whereas the sulfonated, sealed containers are completely unaffected.

EXAMPLE 5

A series (Sample Nos. 1–8) of substrates of different polymers as indicated in Table I are surface treated at room temperature with sulfur trioxide in dry air using different concentrations and periods of treatment as specified in Table I. The surface sulfonated substrates are coated with epoxy resin* (*Reaction product of one part of diglycidyl ether of bisphenol-A with one part of a polyamide curing agent.) and are pressed together and held at ambient conditions for about one week. The laminated substrates are tested for bond strength by separating the substrates using a lap shear technique of Example 2. The results are reported in Table I.

For purposes of comparison, a series (Sample Nos. $A_1$–$A_4$) of untreated substrates of the same polymers are laminated with the epoxy resin used above and the laminated substrates are tested for bond strength using the lap shear technique. The results are recorded in Table I.

TABLE I

| Sample No. | Substrate, Polymer | Sulfonation Conc., mole percent | Treatment, Time, min. | Sulfonation Level, mg. $SO_3/cm.^2$ | Shear Stress at Failure[1], p.s.i. |
|---|---|---|---|---|---|
| 1 | HDPE/HDPE[a] | 10 | 0.75 | 0.019 | 335 |
| 2 | HDPE/HDPE[a] | 10 | 3.0 | 0.070 | 413 |
| $A_1$* | HDPE/HDPE[a] | 0 | 0 | 0 | 34 |
| 3 | PP/PP[b] | 10 | 0.25 | 0.027 | 203 |
| 4 | PP/PP[b] | 10 | 0.75 | 0.104 | 285 |
| $A_2$* | PP/PP[b] | 0 | 0 | 0 | 27 |
| 5 | ABS/ABS[c] | 10 | 0.25 | 0.022 | 360 |
| 6 | ABS/ABS[c] | 10 | 1.0 | 0.044 | 430 |
| $A_3$* | ABS/ABS[c] | 0 | 0 | 0 | 230 |
| 7 | HIPS/HIPS[d] | 5 | 0.25 | 0.008 | 295 |
| 8 | HIPS/HIPS[d] | 5 | 0.5 | 0.015 | 297 |
| $A_4$* | HIPS/HIPS[d] | 0 | 0 | 0 | 165 |

\* Not an example of the invention
[a] HDPE — High density polyethylene having density of 0.967 and melt index of 8.0 dg./min.
[b] PP — Polypropylene having density of 0.904 and melt flow of 2.0 dg./min.
[c] ABS — Acrylonitrile/butadiene/styrene (17/8/75) terpolymer.
[d] HIPS — High impact polystyrene containing 8 weight percent of poly (butadiene) rubber and 92 weight percent of polymerized styrene.
[1] Lap Shear Technique of Example 2.

EXAMPLE 6

Two high density polyethylene gasoline tanks are treated on the surfaces thereof at room temperature with 15 mole percent of sulfur trioxide in dry air for periods of 1/2 minute and 1 minute. The tanks are coated about the opening thereof with epoxy resin* *Reaction product of one part of diglycidyl ether of bisphenol-A with one part of polyamide curing agent. and steel spouts having an external flange are pressed into the opening of the gas tanks. The flange of each spout is mated with the epoxy resin about the opening of the respective tank. The resulting laminates are cured at ambient conditions for a period of about a week. The laminates are tested for bond failure and are found to fail as a result of substrate failure, i.e., destruction of the polyethylene.

For purposes of comparison, an untreated polyethylene gasoline tank is similarly coated with epoxy resin and mated with a similar steel spout having a flange. After curing under identical conditions, the resulting laminate is tested for bond failure an is found to fail as result of bond shear at much lower force than required to produce failure in foregoing samples.

What is claimed is:

1. A process for bonding an olefin polymer to a substrate which comprises (1) surface sulfonating the olefin polymer to a degree of about 0.001 to about 50 milligrams of sulfur trioxide equivalents per square centimeter, (2) applying epoxy resin to the locus of the bond, (3) placing the sulfonated olefin polymer in a contiguous relationship with the substrate such that the epoxy resin forms an inter layer between the sulfonated surface of the olefin polymer and the substrate and (4) curing the epoxy resin for a time and temperature sufficient to develop the maximum bond strength of the epoxy resin.

2. The process according to claim 1 wherein the olefin polymer is polyethylene.

3. The process according to claim 1 wherein the olefin polymer is polypropylene.

4. A process for bonding an olefin polymer to a metal which comprises (1) surface sulfonating the olefin polymer to a degree of about 0.001 to about 50 milligrams of sulfur trioxide equivalents per square centimeter, (2) applying epoxy resin to the locus of the bond, (3) placing the sulfonated olefin polymer in a contiguous relationship with the metal such that the epoxy resin forms an inter layer between the sulfonated surface of the olefin polymer and the metal and (4) curing the epoxy resin for a time and temperature sufficient to develop the maximum bond strength of the epoxy resin.

5. A process for bonding an olefin polymer to glass which comprises (1) surface sulfonating the olefin polymer to a degree of about 0.001 to about 50 milligrams of sulfur trioxide equivalents per square centimeter, (2) applying epoxy resin to the locus of the bond, (3) placing the sulfonated olefin polymer in a contiguous relationship with the glass such that the epoxy resin forms an inter layer between the sulfonated surface of the olefin polymer and the glass and (4) curing the epoxy resin for a time and temperature sufficient to develop the maximum bond strength of the epoxy resin.

6. A process for bonding an olefin polymer to paper which comprises (1) surface sulfonating the olefin polymer to a degreee of about 0.001 to about 50 milligrams of sulfur trioxide equivalents per square centimeter, (2) applying epoxy resin to the locus of the bond, (3) placing the sulfonated olefin polymer in a contiguous relationship with the paper such that the epoxy resin forms an inter layer between the sulfonated surface of the olefin polymer and the paper and (4) curing the epoxy resin for a time and temperature sufficient to develop the maximum bond strength of the epoxy resin.

* * * * *